United States Patent
Shamasundar et al.

(10) Patent No.: US 11,626,024 B2
(45) Date of Patent: Apr. 11, 2023

(54) DISTRIBUTED CONNECTED AIRCRAFT COCKPIT FLIGHT MANAGEMENT SYSTEM AS A NETWORK NODE WITH API SERVICE CAPABTILITIES

(71) Applicant: HONEYWELL INTERNATIONAL INC., Morris Plains, NJ (US)

(72) Inventors: Raghu Shamasundar, Bangalore (IN); Mohan Chandrashekarappa, Hyderabad (IN); Philip Toews, Phoenix, AZ (US); Robert Brownlee, Glendale, AZ (US); Srihari Jayathirtha, Bangalore (IN); Kalimullah Khan, Bangalore (IN); Kiran Venkataramana, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 276 days.

(21) Appl. No.: 16/932,517

(22) Filed: Jul. 17, 2020

(65) Prior Publication Data
US 2021/0327282 A1 Oct. 21, 2021

(30) Foreign Application Priority Data
Apr. 20, 2020 (IN) .............................. 202011016933

(51) Int. Cl.
*G08G 5/00* (2006.01)
*H04L 67/12* (2022.01)
*H04L 67/1097* (2022.01)

(52) U.S. Cl.
CPC .......... *G08G 5/003* (2013.01); *G08G 5/0013* (2013.01); *G08G 5/0021* (2013.01); *H04L 67/1097* (2013.01); *H04L 67/12* (2013.01)

(58) Field of Classification Search
CPC ....................................................... G08G 5/003
See application file for complete search history.

(56) References Cited

U.S. PATENT DOCUMENTS 7,437,225 B1 10/2008 Rathinam
8,818,696 B2 8/2014 Klooster et al.
(Continued)

FOREIGN PATENT DOCUMENTS

EP 3599599 A1 1/2020

OTHER PUBLICATIONS

Schulze, Jonas, "Architectural Design of a Future Flight Management System Supporting 4D Trajectories," Technical University of Darmstadt, Nov. 20, 2018.
(Continued)

*Primary Examiner* — Michael A Berns
(74) *Attorney, Agent, or Firm* — Lorenz & Kopf, LLP (57) ABSTRACT

An avionics system in an aircraft for providing flight data from an onboard flight management computer (FMC) to requesting applications is disclosed. The system includes a flight management system (FMS) service layer executing on the FMC on a thread separate from a thread that executes FMS core functions. The FMS service layer provides a FMC networked node server for responding to queries from a plurality of external applications for data generated from the FMS core functions without interrupting the FMS core functions. The FMC networked node server is configured to: receive a request from a client application using a server specified API for data elements from a specified input flight plan; retrieve the specified input flight plan from the FMS core functions; extract the requested data elements; and output the requested data elements to the client application without affecting the active thread that executes FMS core functions.

20 Claims, 2 Drawing Sheets

(56) References Cited

U.S. PATENT DOCUMENTS

| | | | |
|---|---|---|---|
| 9,043,938 B1* | 5/2015 | Raghu | H04L 63/0846 |
| | | | 726/28 |
| 9,284,045 B1* | 3/2016 | Springer | G08G 5/0034 |
| 9,530,320 B2 | 12/2016 | Bailey et al. | |
| 9,606,534 B2* | 3/2017 | Mere | G08G 5/0021 |
| 9,697,737 B2 | 7/2017 | Hale et al. | |
| 9,967,322 B2 | 5/2018 | Coulmeau et al. | |
| 10,104,012 B2* | 10/2018 | Coulmeau | H04L 67/10 |
| 10,319,240 B2 | 6/2019 | Beernaert | |
| 10,607,499 B2* | 3/2020 | Chen | G09B 9/08 |
| 10,721,259 B2* | 7/2020 | Bush | H04L 63/1433 |
| 10,797,945 B2* | 10/2020 | Toews | H04L 67/12 |
| 10,991,255 B2* | 4/2021 | Hochwarth | G06F 21/53 |
| 11,424,927 B2* | 8/2022 | Castet | H04W 12/086 |
| 2008/0294749 A1 | 11/2008 | Derange et al. | |
| 2015/0066250 A1 | 3/2015 | Garzella et al. | |
| 2015/0148996 A1 | 5/2015 | Mere et al. | |
| 2016/0247412 A1 | 8/2016 | Chen et al. | |
| 2019/0149404 A1 | 5/2019 | Toews et al. | |
| 2019/0311632 A1 | 10/2019 | Hochwarth et al. | |
| 2020/0035116 A1 | 1/2020 | Sivaratri et al. | |
| 2021/0327282 A1* | 10/2021 | Shamasundar | H04L 67/12 |

OTHER PUBLICATIONS

GE Aviation, "Connected Flight Management System cFMS," https://www.geaviation.com/systems/avionics/navigation-guidance/connected-flight-management-system-cfms, downloaded on Jun. 23, 2020.

Schleicher, David R., "Improved Lateral Trajectory Prediction through En Route Air-Ground Data Exchange," AIAA's Aircraft Technology, Integration, and Operations (ATIO) 2002 Technical Oct. 1-3, 2002, Los Angeles, California.

S. Ramasamy, R. Sabatini, A. Gardi, T. Kistan, "Next Generation Flight Management System for Real-Time Trajectory Based Operations", Applied Mechanics and Materials, vol. 629, pp. 344-349, Trans Tech Publications, 2014. DOI: 10.4028/www.scientific.net/AMM.629.344.

* cited by examiner

DISTRIBUTED CONNECTED AIRCRAFT COCKPIT FLIGHT MANAGEMENT SYSTEM AS A NETWORK NODE WITH API SERVICE CAPABTILITIES

CROSS REFERENCE TO RELATED APPLICATION

This application claims priority to Indian Provisional Patent Application No. 202011016933, filed Apr. 20, 2020, the entire content of which is incorporated by reference herein.

TECHNICAL FIELD

Embodiments of the subject matter described herein relate generally to flight deck equipment. More particularly, embodiments of the subject matter relate to systems and methods for providing real-time data in aircraft.

BACKGROUND

Flight operations, air traffic controllers, engineering and ground operations need to know what is happening to an aircraft in real-time, so they can respond quickly and efficiently to reduce operational costs and enhance safety and situational awareness. Current systems and methods for determining what is happening to an aircraft rely on simulated or predicted flight data. The simulated or predicted flight data are not as accurate as actual flight data.

Hence, it is desirable to provide systems and methods for providing real flight data during operations. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An avionics system in an aircraft for providing flight data from an onboard flight management computer (FMC) to requesting applications is disclosed. The system includes a flight management system (FMS) service layer executing on the FMC on a thread separate from a thread that executes FMS core functions. The FMS service layer provides a FMC networked node server for responding to queries from a plurality of external applications for data generated from the FMS core functions without interrupting the FMS core functions. The FMC networked node server is configured to: receive, via a connectivity channel, a request from a client application identified by a unique client ID using a FMC networked node server specified API (application programming interface) for data elements from a specified input flight plan and set of constraints; retrieve the specified input flight plan and set of constraints from the FMS core functions; extract the requested data elements; and output the requested data elements via the connectivity channel to the client application identified by the unique client ID without affecting the active thread that executes FMS core functions. The server can maintain communication with multiple clients as they are uniquely identified by a Client ID for query and response communication.

A method in an avionics system in an aircraft for providing flight data from an onboard flight management computer (FMC) to requesting applications is disclosed. The method includes providing a flight management system (FMS) service layer executing on the FMC on a thread separate from a thread that executes FMS core functions, wherein the FMS service layer provides a FMC networked node server for responding to queries from a plurality of external applications for data generated from the FMS core functions without interrupting the FMS core functions. The method further includes receiving, by the FMC networked node server via a connectivity channel, a request from a client application identified by a unique client ID using a FMC networked node server specified in the API (application programming interface) for data elements from a specified input flight plan and set of constraints; retrieving, by the FMC networked node server, the specified input flight plan and set of constraints from the FMS core functions; extracting, by the FMC networked node server, the requested data elements; and outputting, by the FMC networked node server, the requested data elements via the connectivity channel to the client application identified by the unique client ID without affecting the active thread that executes FMS core functions. The server can maintain communication with multiple clients as they are uniquely identified by a Client ID for query and response communication.

A network node on an aircraft is disclosed. The network node includes: a flight management computer (FMC) having a plurality of execution threads wherein flight management system (FMS) core functions execute on dedicated threads; and a FMS service layer executing on a separate thread of the FMC, wherein the FMS service layer provides a FMC networked node server for responding to queries from a plurality of external applications for data generated from the FMS core functions without interrupting the FMS core functions. The FMC networked node server is configured to: receive, via a connectivity channel, a request from a client application identified by a unique client ID using a FMC networked node server specified in the API (application programming interface) for data elements from a specified input flight plan and set of constraints; retrieve the specified input flight plan and set of constraints from the FMS core functions; extract the requested data elements; and output the requested data elements via the connectivity channel to the client application identified by the unique client ID without affecting the active thread that executes FMS core functions. The network node further includes a data gateway unit that provides the connectivity channel by functioning as an access point between the FMC networked node server and the external applications and implements the FMC networked node server specified in the API to allow communication between the FMC networked node server and the external applications.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to communications, signal processing, data transmission, networking, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing a cockpit flight management computer networked node server that is capable of building responses from FMS core functions and providing the response to external client applications. The external applications can invoke the onboard service through a defined channel or from another external server hosted in the cockpit or in a cloud based system.

The described apparatus, systems, techniques and articles provide for a cockpit flight management computer networked node server to interact with FMC internal data. This can allow for discrete data retrieval (e.g., cruise altitude, fuel on board at destination), aggregated data retrieval (e.g., active 4D trajectory, flight summary), computational services retrieval (e.g., 4D trajectory for a given flight plan, trip fuel/time for a flight mod request), and others.

The described apparatus, systems, techniques and articles provided herein can allow client applications to connect and retrieve services from the target aircraft API itself instead of ground-based simulations. The apparatus, systems, techniques and articles provided herein can provide an onboard connected FMS thread that can service multiple clients without affecting the foreground active flight plan and without pilot involvement. The apparatus, systems, techniques and articles provided herein can eliminate the need for several ground simulation instances each configured for different aircraft types due to varying Aero-Engine database (AEDB), performance data base (PDB) and missing individual aircraft characteristics. The apparatus, systems, techniques and articles provided herein can provide a connected aircraft FMS node that can be queried in all phases of flight either on ground or in air to retrieve data independent of the current active plan in the system. The apparatus, systems, techniques and articles provided herein can network cockpit and ground applications seamlessly with capabilities for Mobile and EFB (electronic flight bag) equipment also to interface to the FMS (flight management system) using secure connectivity channels.

The described apparatus, systems, techniques and articles can provide a connected distributed aircraft cockpit flight management computer as a networked node server with API capability to service client requests from on-board, off-board and cloud/remote systems. The networked node server manages a background process hosted in Flight Management computer (FMC) accepting requests from multiple applications identified by their representative unique client IDs and share as output via the connectivity channel the response without affecting the active foreground process of the FMC. The client applications can query different FMC platforms in a connected aircraft environment.

The described apparatus, systems, techniques and articles can allow client applications (on-board and off-board, embedded cockpit and mobile, etc.) interested in data elements of a specific aircraft to query the connected aircraft FMS node using the server specified API for a specified input flight plan and set of constraints. The connected aircraft cockpit FMS node will receive and inject the reference requested flight plan and constraints into a background thread managing the server to generate the requested data. The data is then communicated back to the requesting client via the server defined API. The server can maintain communication with multiple clients as they are uniquely identified by a Client ID for query and response communication. Secure communication protocols can be incorporated into the server defined API.

Figure 1:
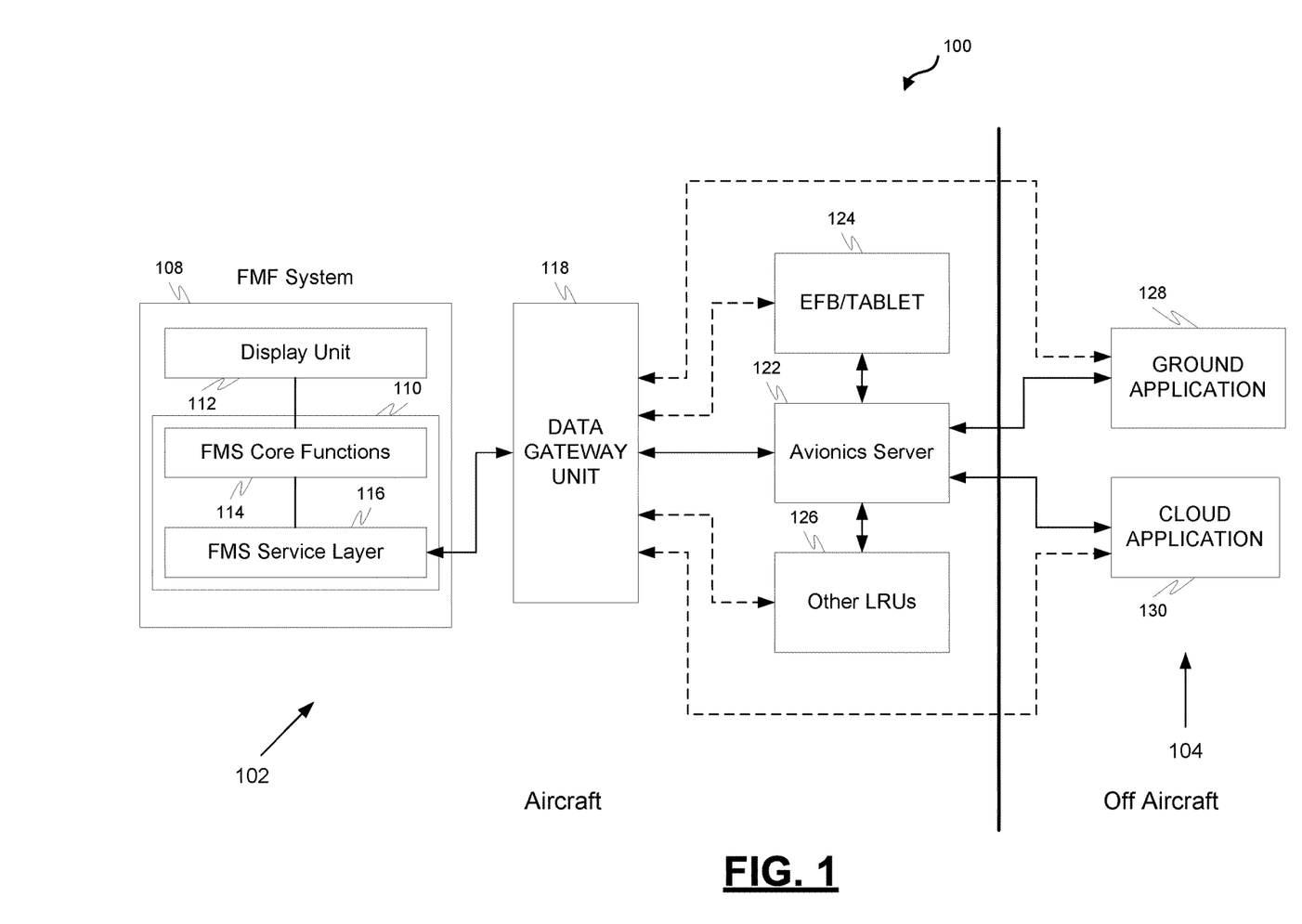
FIG. 1 is a block diagram of an example avionics environment in which flight data from an onboard flight management computer (FMC) is provided to requesting applications, in accordance with some embodiments.

FIG. 1 is a block diagram of an example avionics environment 100 in which flight data from an onboard flight management computer (FMC) is provided to requesting applications. The example avionics environment 100 includes aircraft systems 102 and cloud/ground systems 104.

The aircraft systems 102 include a flight management function (FMF) system 108 provided by a flight management computer (FMC) 110 and a display unit (DU) 112. The FMC 110 is a specialized computer system that automates a wide variety of in-flight tasks, reducing the workload on the flight crew. A primary function is in-flight management of the flight plan. Using various sensors (such as GPS and INS) to determine the aircraft's position, the FMC 110 can guide the aircraft along the flight plan. From the cockpit, the example FMC 110 is controlled by the DU 112, which incorporates a small screen and a keyboard or touchscreen.

The FMC 110 sends the flight plan for display to the Electronic Flight Instrument System (EFIS), Navigation Display (ND), or Multifunction Display (MFD) in the aircraft.

The FMC 110 includes multiple execution threads with flight management system (FMS) core functions 114 executing on one thread and an FMS service layer 116 executing on a different thread. The FMS core functions 114 perform the in-flight management of the flight plan and guide the aircraft along the flight plan, among other things.

The FMS service layer 116 provides a FMC networked node server for responding to queries from a plurality of external applications for data generated from the FMC core functions without interrupting the FMC core functions. The data may include discrete data (e.g., cruise altitude, fuel on board at destination), aggregated data (e.g., active 4D trajectory, flight summary), computational services data (e.g., 4D trajectory for a given flight plan, trip fuel/time for a flight mod request), and others. The example FMS service layer 116 executes on a background thread separate from a foreground thread in the CMC 110 that executes FMC core functions. The FMC networked node server is configured to receive, via a connectivity channel, a request from a client application (on-board and off-board, embedded cockpit and mobile etc.) identified by a unique client ID using a FMC networked node server specified API (application programming interface) for data elements from a specified input flight plan and set of constraints; retrieve the specified input flight plan and set of constraints from the FMS core functions; extract the requested data elements; and output the requested data elements via the connectivity channel to the client application identified by the unique client ID without affecting the active thread that executes the FMS core functions. The FMC networked node server can maintain communication with multiple client applications because they are uniquely identified by a client ID for query and response communication. Secure communication protocols may be incorporated into the FMC networked node server specified API.

The aircraft systems 102 also include a data gateway unit 118. The data gateway unit 118 is a network node that serves as an access point between the FMC networked node server implemented by the FMS service layer 116 and the external applications. The data gateway unit 118 implements the FMC networked node server specified API to allow communication between the FMC networked node server and the external applications. The data gateway unit 118 provides the connectivity channel. The data gateway unit comprises one or more processors that are configured by programming instructions on non-transitory computer readable media. The data gateway unit 118 may communicate using more than one protocol to connect to a plurality of different networks such as internal cockpit networks, other internal aircraft networks, external cloud based networks, external ground based networks, and others.

The aircraft systems 102, in this example, includes an avionics server 122 in the aircraft that is configured to facilitate communication between the client application and the data gateway unit by converting communications from the client application to a format compatible with the data gateway unit and converting communication from the data gateway unit to a format compatible with the client application. The avionics server 122 can function as an intermediary to allow applications that are not adapted to work with the FMC networked node server specified API to query and receive responses from the FMC networked node server. The avionics server 122 can respond to queries from applications by receiving the query, converting the query to a format that is compatible with the FMC networked node server specified API, forwarding the converted query to the FMC networked node server via the data gateway unit 118, receive responses to the query from the FMC networked node server via the data gateway unit 118, and provide the response to the requesting application. The avionics server 122 can increase the availability of the FMC networked node server to applications that are not adapted to be compatible with the FMC networked node server specified API. The avionics server 122 may be implemented by software, hardware or both.

The client applications that may query and receive responses from the FMC networked node server may execute on many different platforms because of the functionality of the data gateway unit 118 and/or the avionics server 122. The client applications may comprise hardware, software or both.

A client application may execute on a mobile device 124 on the aircraft, e.g., an EFB (electronic flight bag), tablet computer, laptop computer, smart phone, and others. The mobile device 124 may communicate with the FMC networked node server via the avionics server 122 or may be specially configured to communicate with the FMC networked node server directly via the data gateway unit 118.

A client application may execute on an LRU system 126 on the aircraft, e.g., a radar system, TCAS (Traffic Alert and collision avoidance system), EGPWS (enhanced Ground Proximity warning system), ATSU (Air Traffic Service Unit), and others. The LRU system 126 may be an onboard cockpit systems or some other aircraft system. The LRU system 126 may communicate with the FMC networked node server via the avionics server 122 or may be specially configured to communicate with the FMC networked node server directly via the data gateway unit 118.

A client application may execute on a cloud/ground systems 104 such as a ground application client 128, e.g, Maintenance, BITE, Ground Datalink Operations and others, or a remote cloud client application 130, e.g, Maintenance cloud application, Dispatcher Client Application, and others. The applications in the cloud/ground systems 104 may communicate with the FMC networked node server via the avionics server 122 or may be specially configured to communicate with the FMC networked node server directly via the data gateway unit 118.

Figure 2:
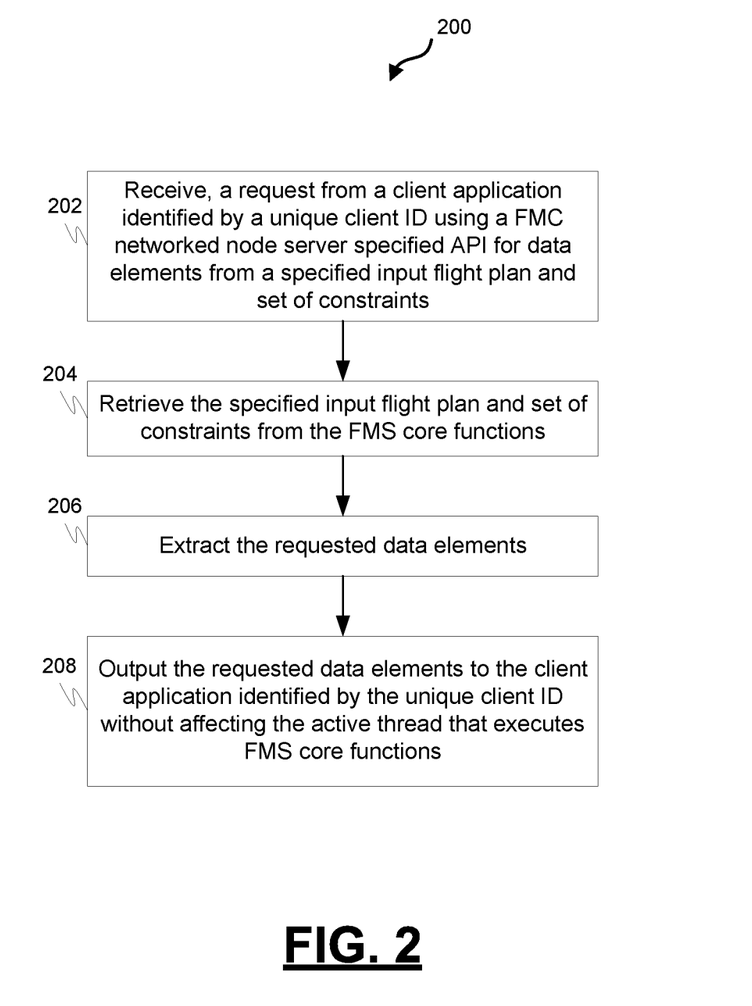
FIG. 2 is a process flow chart depicting an example process in an avionics system in an aircraft for providing flight data from an onboard flight management computer (FMC) to requesting applications, in accordance with some embodiments.

FIG. 2 is a process flow chart depicting an example process 200 in an avionics system in an aircraft for providing flight data from an onboard flight management computer (FMC) to requesting applications. The FMC provides FMS core functions executing on one thread and an FMS service layer executing on a different thread. The FMS service layer provides a FMC networked node server for responding to queries from a plurality of external applications for data generated from the FMS core functions without interrupting the FMS core functions.

The example process 200 includes receiving, by the FMC networked node server, a request from a client application identified by a unique client ID using a FMC networked node server specified API for data elements from a specified input flight plan and set of constraints (operation 202). The data elements may include discrete data (e.g., cruise altitude, fuel on board at destination), aggregated data (e.g., active 4D trajectory, flight summary), computational services data (e.g., 4D trajectory for a given flight plan, trip fuel/time for a flight mod request), and others. The request from a client application is received via a gateway unit 118 comprising one or more processors configured by programming instructions on non-transitory computer readable media. The FMC networked node server can maintain communication with multiple client applications because they are uniquely identified by a client ID for query and response communication. Secure communication protocols may be incorporated into the FMC networked node server specified API. The gateway unit 118 may receive the request from a client application directly, if the client application is adapted to communicate using the FMC networked node server specified API, or indirectly through an avionics server 122 that is configured to facilitate communication between the client application and the data gateway unit 118 by converting communications from the client application to a format compatible with the data gateway unit and converting communication from the data gateway unit to a format compatible with the client application.

The client application may execute on a mobile device (e.g., EFB, Tablet computer, laptop, smart phone, and others), an aircraft LRU system (e.g., radar and others) that is external to the FMS, or a ground or cloud based computing system.

The example process 200 includes retrieving, by the FMC networked node server, the specified input flight plan and set of constraints from the FMS core functions (operation 204) and extracting, by the FMC networked node server, the requested data elements (operation 206). The data elements may include discrete data (e.g., cruise altitude, fuel on board at destination), aggregated data (e.g., active 4D trajectory, flight summary), computational services data (e.g., 4D trajectory for a given flight plan, trip fuel/time for a flight mod request), and others. This is done without interrupting the FMS core functions.

The example process 200 includes outputting, by the FMC networked node server, the requested data elements to the client application identified by the unique client ID without affecting the active thread that executes FMS core functions (operation 208). The FMC networked node server can maintain communication with multiple clients because they are uniquely identified by a Client ID for query and response communication. The FMC networked node server outputs using the gateway unit 118 and in many instances also through the avionics server 122.

Described herein are apparatus, systems, techniques and articles for providing a cockpit flight management computer networked node server that is capable of building responses from FMS core functions and providing the response to external client applications.

In one embodiment, an avionics system in an aircraft for providing flight data from an onboard flight management computer (FMC) to requesting applications is provided. The system comprises a flight management system (FMS) service layer executing on the FMC on a thread separate from a thread that executes FMS core functions. The FMS service layer provides a FMC networked node server for responding to queries from a plurality of external applications for data generated from the FMS core functions without interrupting the FMS core functions. The FMC networked node server is configured to: receive, via a connectivity channel, a request from a client application identified by a unique client ID using a FMC networked node server specified API (application programming interface) for data elements from a specified input flight plan and set of constraints; retrieve the specified input flight plan and set of constraints from the FMS core functions; extract the requested data elements; and output the requested data elements via the connectivity channel to the client application identified by the unique client ID without affecting the active thread that executes FMS core functions. The server can maintain communication with multiple clients as they are uniquely identified by a Client ID for query and response communication.

These aspects and other embodiments may include one or more of the following features. The avionics system may further comprise a gateway unit that provides the connectivity channel by functioning as an access point between the FMC networked node server and the external applications and implements the FMC networked node server specified API to allow communication between the FMC networked node server and the external applications. The client application may communicate with the FMC networked node server directly through the data gateway unit. The avionics system may further comprise an avionics server configured to facilitate communication between the client application and the data gateway unit by converting communications from the client application to a format compatible with the data gateway unit and converting communication from the data gateway unit to a format compatible with the client application. The client application may execute on a mobile device. The client application may execute on an aircraft LRU system that may be external to the FMS. The client application may execute on a ground or cloud based computing system. The FMS core functions perform in-flight management of a flight plan and guide the aircraft along the flight plan. Secure communication protocols may be incorporated into the server defined API.

In another embodiment, a method in an avionics system in an aircraft for providing flight data from an onboard flight management computer (FMC) to requesting applications is provided. The method comprises providing a flight management system (FMS) service layer executing on the FMC on a thread separate from a thread that executes FMS core functions, wherein the FMS service layer provides a FMC networked node server for responding to queries from a plurality of external applications for data generated from the FMS core functions without interrupting the FMS core functions. The method further comprises receiving, by the FMC networked node server via a connectivity channel, a request from a client application identified by a unique client ID using a FMC networked node server specified in the API (application programming interface) for data elements from a specified input flight plan and set of constraints; retrieving, by the FMC networked node server, the specified input flight plan and set of constraints from the FMS core functions; extracting, by the FMC networked node server, the requested data elements; and outputting, by the FMC networked node server, the requested data elements via the connectivity channel to the client application identified by the unique client ID without affecting the active thread that executes FMS core functions. The server can maintain communication with multiple clients as they are uniquely identified by a Client ID for query and response communication.

These aspects and other embodiments may include one or more of the following features. A gateway unit may provide the connectivity channel by functioning as an access point between the FMC networked node server and the external applications and implements the FMC networked node server specified API to allow communication between the FMC networked node server and the external applications. The client application may communicate with the FMC networked node server directly through the data gateway unit. An avionics server may be provided for facilitating communication between the client application and the data gateway unit by converting communications from the client application to a format compatible with the data gateway unit and converting communication from the data gateway unit to a format compatible with the client application. The client application may execute on a mobile device. The client application may execute on an aircraft LRU system that is external to the FMS. The client application may execute on a ground or cloud based computing system. Secure communication protocols may be incorporated into the server defined API.

In another embodiment, a network node on an aircraft comprises: a flight management computer (FMC) having a plurality of execution threads wherein flight management system (FMS) core functions execute on dedicated threads; and a FMS service layer executing on a separate thread of the FMC, wherein the FMS service layer provides a FMC networked node server for responding to queries from a plurality of external applications for data generated from the FMS core functions without interrupting the FMS core functions. The FMC networked node server is configured to: receive, via a connectivity channel, a request from a client application identified by a unique client ID using a FMC networked node server specified in the API (application programming interface) for data elements from a specified input flight plan and set of constraints; retrieve the specified input flight plan and set of constraints from the FMS core functions; extract the requested data elements; and output the requested data elements via the connectivity channel to the client application identified by the unique client ID without affecting the active thread that executes FMS core functions. The network node further comprises a data gateway unit that provides the connectivity channel by functioning as an access point between the FMC networked node server and the external applications and implements the FMC networked node server specified in the API to allow communication between the FMC networked node server and the external applications.

These aspects and other embodiments may include one or more of the following features. The client application may communicate with the FMC networked node server directly through the data gateway unit. The network node may further comprise an avionics server configured to facilitate communication between the client application and the data gateway unit by converting communications from the client application to a format compatible with the data gateway unit and converting communication from the data gateway unit to a format compatible with the client application. The client application may execute on a mobile device. The client application may execute on an aircraft LRU system that may be external to the FMS. The client application may execute on a ground or cloud based computing system. The FMS core functions perform in-flight management of a flight plan and guide the aircraft along the flight plan. Secure communication protocols may be incorporated into the server defined API.

In another embodiment, non-transitory computer readable media encoded with programming instructions configurable to cause a processor in a flight management computer (FMC) to perform a method is provided. The method comprises providing a flight management system (FMS) service layer executing on the FMC on a thread separate from a thread that executes FMS core functions, wherein the FMS service layer provides a FMC networked node server for responding to queries from a plurality of external applications for data generated from the FMS core functions without interrupting the FMS core functions. The method further comprises receiving, by the FMC networked node server via a connectivity channel, a request from a client application identified by a unique client ID using a FMC networked node server specified in the API (application programming interface) for data elements from a specified input flight plan and set of constraints; retrieving, by the FMC networked node server, the specified input flight plan and set of constraints from the FMS core functions; extracting, by the FMC networked node server, the requested data elements; and outputting, by the FMC networked node server, the requested data elements via the connectivity channel to the client application identified by the unique client ID without affecting the active thread that executes FMS core functions. The server can maintain communication with multiple clients as they are uniquely identified by a Client ID for query and response communication.

These aspects and other embodiments may include one or more of the following features. A gateway unit may provide the connectivity channel by functioning as an access point between the FMC networked node server and the external applications and implements the FMC networked node server specified API to allow communication between the FMC networked node server and the external applications. The client application may communicate with the FMC networked node server directly through the data gateway unit. The client application may execute on a mobile device. The client application may execute on an aircraft LRU system that is external to the FMS. The client application may execute on a ground or cloud based computing system. Secure communication protocols may be incorporated into the server defined API.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionics system in an aircraft for providing flight data from an onboard flight management computer (FMC) to requesting applications, the system comprising:
    an FMC that includes a plurality of execution threads with a flight management system (FMS) service layer executing on a first thread of the plurality of execution threads and FMS core functions executing on a second thread of the plurality of execution threads that is different from the first thread wherein the FMS core functions perform in-flight management of a flight plan and guide the aircraft along the flight plan, the FMS service layer providing a FMC networked node server for responding to queries from a plurality of external applications for data generated from the FMS core functions without interrupting the FMS core functions, the FMC networked node server configured to:
        receive, via a connectivity channel, a request from a client application identified by a unique client ID using a FMC networked node server specified API (application programming interface) for data elements from a specified input flight plan and set of constraints;
        retrieve the specified input flight plan and set of constraints from the FMS core functions;
        extract the requested data elements; and
        output the requested data elements via the connectivity channel to the client application identified by the unique client ID without affecting an active thread that executes FMS core functions;
    wherein the FMC networked node server can maintain communication with multiple clients as they are uniquely identified by a Client ID for query and response communication.

2. The avionics system of claim 1, further comprising a gateway unit that provides the connectivity channel by functioning as an access point between the FMC networked node server and the external applications and implements the FMC networked node server specified API to allow communication between the FMC networked node server and the external applications.

3. The avionics system of claim 2, wherein the client application communicates with the FMC networked node server directly through the gateway unit.

4. The avionics system of claim 2, further comprising an avionics server configured to facilitate communication between the client application and the data gateway unit by converting communications from the client application to a format compatible with the data gateway unit and converting communication from the gateway unit to a format compatible with the client application.

5. The avionics system of claim 1, wherein the client application executes on a mobile device.

6. The avionics system of claim 1, wherein the client application executes on an aircraft line replaceable unit (LRU) system that is external to the FMS.

7. The avionics system of claim 1, wherein the client application executes on a ground or cloud based computing system.

8. The avionics system of claim 1, wherein the FMS core functions perform in-flight management of a flight plan and guide the aircraft along the flight plan.

9. The avionics system of claim 1, wherein secure communication protocols are incorporated into the FMC networked node server specified API.

10. A method in an avionics system in an aircraft for providing flight data from an onboard flight management computer (FMC) to requesting applications, the method comprising:
    providing an FMC that includes a plurality of execution threads with a flight management system (FMS) service layer executing on a first thread of the plurality of execution threads and FMS core functions executing on a second thread of the plurality of execution threads that is different from the first thread wherein the FMS core functions perform in-flight management of a flight plan and guide the aircraft along the flight plan, the FMS service layer providing a FMC networked node server for responding to queries from a plurality of external applications for data generated from the FMS core functions without interrupting the FMS core functions;

receiving, by the FMC networked node server via a connectivity channel, a request from a client application identified by a unique client ID using a FMC networked node server specified API (application programming interface) for data elements from a specified input flight plan and set of constraints;

retrieving, by the FMC networked node server, the specified input flight plan and set of constraints from the FMS core functions;

extracting, by the FMC networked node server, the requested data elements; and outputting, by the FMC networked node server, the requested data elements via the connectivity channel to the client application identified by the unique client ID without affecting an active thread that executes FMS core functions;

wherein the FMC networked node server can maintain communication with multiple clients as they are uniquely identified by a Client ID for query and response communication.

11. The method of claim 10, further comprising a gateway unit that provides the connectivity channel by functioning as an access point between the FMC networked node server and the external applications and implements the FMC networked node server specified API to allow communication between the FMC networked node server and the external applications.

12. The method of claim 11, wherein the client application communicates with the FMC networked node server directly through the gateway unit.

13. The method of claim 11, further comprising providing an avionics server for facilitating communication between the client application and the data gateway unit by converting communications from the client application to a format compatible with the data gateway unit and converting communication from the gateway unit to a format compatible with the client application.

14. The method of claim 10, wherein the client application executes on a mobile device.

15. The method of claim 10, wherein the client application executes on an aircraft line replaceable unit (LRU) system that is external to the FMS.

16. The method of claim 10, wherein the client application executes on a ground or cloud based computing system.

17. The method of claim 10, wherein the FMS service layer executes on the FMC on a background thread separate from a foreground thread that executes FMS core functions.

18. A network node on an aircraft comprising:
a flight management computer (FMC) having a plurality of execution threads wherein flight management system (FMS) core functions execute on one or more dedicated threads and perform in-flight management of a flight plan and guide the aircraft along the flight plan; and
an FMS service layer executing on a thread of the FMC that is different from the one or more dedicated threads on which the FMC core functions execute, the FMS service layer providing a FMC networked node server for responding to queries from a plurality of external applications for data generated from the FMS core functions without interrupting the FMS core functions, the FMC networked node server configured to:
receive, via a connectivity channel, a request from a client application (on-board and off-board, embedded cockpit and mobile etc.) identified by a unique client ID using a FMC networked node server specified API (application programming interface) for data elements from a specified input flight plan and set of constraints;
retrieve the specified input flight plan and set of constraints from the FMS core functions;
extract the requested data elements; and
output the requested data elements via the connectivity channel to the client application identified by the unique client ID without affecting an active thread that executes FMS core functions; and
a data gateway unit that provides the connectivity channel by functioning as an access point between the FMC networked node server and the external applications and implements the FMC networked node server specified API to allow communication between the FMC networked node server and the external applications.

19. The network node of claim 18, wherein the client application communicates with the FMC networked node server directly through the data gateway unit.

20. The network node of claim 18, further comprising an avionics server configured to facilitate communication between the client application and the data gateway unit by converting communications from the client application to a format compatible with the data gateway unit and converting communication from the data gateway unit to a format compatible with the client application.

* * * * *